(12) United States Patent
Deazley (10) Patent No.: US 8,070,104 B2
(45) Date of Patent: Dec. 6, 2011

(54) PARACHUTE DEPLOYMENT LINE AND CUT KNIFE

(75) Inventor: Francis Deazley, Kissimmee, FL (US)

(73) Assignee: Strong Enterprises, Orlando, FL (US)

( * ) Notice: Subject to any disclaimer, the term of this patent is extended or adjusted under 35 U.S.C. 154(b) by 0 days.

(21) Appl. No.: 13/040,842

(22) Filed: Mar. 4, 2011

(65) Prior Publication Data

US 2011/0155857 A1 Jun. 30, 2011

Related U.S. Application Data

(62) Division of application No. 11/882,325, filed on Jul. 31, 2007, now Pat. No. 7,922,123.

(51) Int. Cl.
*B64D 1/12* (2006.01)

(52) U.S. Cl. .............. 244/137.3; 244/137.1; 244/151 B (58) Field of Classification Search ............... 244/137.3, 244/137.1, 151 B, 147, 151 A; 30/91.2, 109–113; 131/248
See application file for complete search history.

(56) References Cited

U.S. PATENT DOCUMENTS

| | | |
|---|---|---|
| 3,934,848 A | 1/1976 | Snyder |
| 4,337,913 A | 7/1982 | Booth |
| 4,398,686 A | 8/1983 | Leger et al. |
| 4,746,084 A | 5/1988 | Strong |
| 4,779,824 A | 10/1988 | Leger |
| 4,837,931 A | 6/1989 | Beermann |
| 4,923,150 A | 5/1990 | Calkins et al. |
| 5,284,310 A * | 2/1994 | Conway, Jr. ............... 244/151 B |
| 5,303,721 A | 4/1994 | Bowen et al. |
| 5,715,602 A | 2/1998 | Hage |
| D425,658 S | 5/2000 | Stahl |
| 6,056,242 A | 5/2000 | Collins |
| 6,216,346 B1 | 4/2001 | Wechsler |
| 6,604,712 B2 | 8/2003 | Kurtgis |
| 6,983,913 B2 | 1/2006 | Auvray |
| 7,003,883 B2 | 2/2006 | Tapper |
| 2007/0044322 A1 | 3/2007 | Trbovich, Jr. et al. |

* cited by examiner

*Primary Examiner* — Christopher P Ellis
(74) *Attorney, Agent, or Firm* — Finnegan, Henderson, Farabow, Garrett & Dunner, L.L.P.

(57) ABSTRACT

A releasable deployment line for a parachute system is provided. The releasable deployment line may include a first segment of material including an aircraft end configured to be operably connected to an aircraft, and a release end configured to be operably connected to a first section of a multi-ring release system. The replaceable deployment line may further include a second segment of material including a container end configured to be operably connected to a parachute container, and a ring end configured to be operably connected to a second section of the multi-ring release system and a third segment of material. The third segment of material may include a parachute end configured to be operably connected to a parachute within the parachute container, and a pin end configured to be operably connected to a retaining pin associated with the first section of the multi-ring release system.

11 Claims, 7 Drawing Sheets

PARACHUTE DEPLOYMENT LINE AND CUT KNIFE

This application is a divisional of U.S. application Ser. No. 11/882,325, filed Jul. 31, 2007 now U.S. Pat. No. 7,922,123, the disclosure of which is incorporated herein by reference.

TECHNICAL FIELD

The present disclosure relates to parachute deployment systems. More particularly, the disclosure relates to a parachute deployment line and restraint release device associated with parachute deployment.

BACKGROUND INFORMATION

Air based cargo delivery systems (e.g., parachute based delivery) are frequently used to drop cargo or persons from an aircraft and control descent (e.g., speed) of the cargo such that the cargo may land safely and be recovered by a ground team. To accomplish this task, an item of cargo may be equipped with a parachute system, including a parachute container, a parachute, a restraint release device (e.g., a cut-knife), and a static line connected to the parachute container and canopy, among other things. This parachute system may initially be affixed to the cargo item via one or more lengths of restraint material (e.g., nylon cord) in preparation for transport to a desired location via an aircraft.

Prior to the cargo exiting the aircraft at altitude, one end of the static line may be connected to an anchor in the aircraft such that, upon exit of the cargo, tension may be applied to the static line causing the restraint release device to release (e.g., cut) the segments of material affixing the parachute system to the cargo. Once these segments are cut, the static line may cause the parachute container to be opened and the canopy to separate from the static line and parachute container. The dangling static line and parachute container may then be retrieved and brought into the aircraft by aircraft personnel.

In some circumstances (e.g., high altitude delivery) it has been desirable to utilize a "release away" or "breakaway" static line to eliminate the need for a crewman to retrieve the static line and parachute container from outside the aircraft. These release away static lines may include a "U" connector between two segments of static line, and a locking loop configured to hold the U connector in place, among other things. When tension is applied to such a static line, the force required to release the U connector from the locking loop and achieve the "release away" may increase exponentially with the amount of tension present in the static line. Twisting of the releasable static line also may further increase forces associated with release. Testing of some releasable static lines has demonstrated that where 100 pounds of tension is applied to a straight releasable static line, 200 pounds of force, or more, may be used to release the U connector.

Also adding to the forces associated with the releasable static line may be a force associated with a restraint release device for releasing the parachute container from its pre-drop location. Prior art "cut-knives" used for such purposes may dull quickly (e.g., as a result of excessive force), resulting in additional force to cause the cutting of the restraint material. In some instances, it has been determined that in excess of 400 pounds of force has been used to cut the restraint material.

Large forces exerted on the releasable static line, such as from the release-away and restraint release systems, may cause problems such as recoil of the static line and subsequent damage to the aircraft, parachute system, and/or aircraft crew. Therefore, it may be desirable to limit the force necessary to cause the release away of a releasable static line associated with a parachute.

Further, previous restraint release devices have suffered from other issues such as, their inability to be reused based on sharpening difficulties. Therefore, using and replacing such devices can may become cost ineffective.

The present disclosure is directed to addressing one or more of the desires and issues discussed above utilizing various examples of a releasable parachute deployment line and/or restraint release device.

Although the present invention may obviate one or more of the above-mentioned needs, it should be understood that some aspects and embodiments of the invention might not necessarily obviate one or more of those needs.

SUMMARY OF THE DISCLOSURE

In the following description, certain aspects and embodiments will become evident. It should be understood that the invention, in its broadest sense, could be practiced without having one or more features of these aspects and embodiments. It should also be understood that these aspects and embodiments are merely exemplary.

In one aspect, as embodied and broadly described herein, a releasable deployment line for a parachute system is provided. The releasable deployment line may include a first segment of material comprising an aircraft end configured to be operably connected to an aircraft, and a release end configured to be operably connected to a first section of a multi-ring release system. The releasable deployment line may further include a second segment of material comprising a container end configured to be operably connected to a parachute container, and a ring end configured to be operably connected to a second section of the multi-ring release system, and a third segment of material comprising a parachute end configured to be operably connected to a parachute within the parachute container, and a pin end configured to be operably connected to a retaining pin associated with the first section of the multi-ring release system.

In another aspect, a restraint release device for a parachute system is provided. The restraint release device may include a frame comprising a first support member and a second support member, each of the first member and the second member further comprising an aperture configured to receive at least one object. The restraint release device may further include two or more blades each comprising a cutting surface, wherein the two or more blades are opposably mounted at a blade end associated with the frame, wherein the cutting surface of each of the two or more blades is exposed within the aperture such that an acute angle between the cutting surface of each of the two or more blades is formed within the aperture at the blade end, wherein the restraint release device is operably connected to a deployment line associated with the parachute system.

In yet another aspect, a parachute deployment system is provided. The parachute deployment system may include a first segment of material comprising an aircraft end configured to be operably connected to an aircraft, and a release end configured to be operably connected to a first section of a multi-ring release system, and a second segment of material comprising a container end configured to be operably connected to a parachute container, and a ring end configured to be operably connected to a second section of the multi-ring release system. The parachute deployment system may further include a third segment of material comprising a parachute end configured to be operably connected to a parachute within the parachute container, and a pin end configured to be operably connected to a retaining pin associated with the first section of the multi-ring release system, wherein the retaining pin is configured to be slidably positioned within a retaining loop associated with the multi-ring release system, and a restraint release device. The restraint release device may include a frame comprising a first support member and a second support member, each of the first member and the second member further comprising an aperture configured to receive at least one object, and two or more blades each comprising a cutting surface. The two or more blades may be opposably mounted at a blade end associated with the frame and with the cutting surface of each of the two or more blades exposed within the aperture such that an angle between the cutting surface of each of the two or more blades is formed within the aperture at the blade end. The restraint release device may be operably connected to a deployment line associated with the parachute system.

In yet another aspect, a system is provided. The system may include a cargo, a parachute operably connected to the cargo, and a releasable deployment line operably connected to the parachute. The releasable deployment line may include a first segment of material comprising an aircraft end configured to be operably connected to an aircraft, and a release end configured to be operably connected to a first section of a multi-ring release system, and a second segment of material comprising a container end configured to be operably connected to a parachute container, and a ring end configured to be operably connected to a second section of the multi-ring release system. The releasable deployment line may further include a third segment of material comprising a parachute end configured to be operably connected to a parachute within the parachute container, and a pin end configured to be operably connected to a retaining pin associated with the first section of the multi-ring release system, wherein the retaining pin is configured to be slidably positioned within a retaining loop associated with the multi-ring release system. The system may further include a restraint release device operably connected to the releasable deployment line. The restraint release device may include a frame comprising a first support member and a second support member, each of the first member and the second member further comprising an aperture configured to receive at least one object, and two or more blades each comprising a cutting surface. The two or more blades may be opposably mounted at a blade end associated with the frame, and the cutting surface of each of the two or more blades may be exposed within the aperture such that an acute angle between the cutting surface of each of the two or more blades is formed within the aperture at the blade end.

Aside from the structural arrangements set forth above, the invention could include a number of other arrangements, such as those explained hereinafter. It is to be understood that both the foregoing description and the following description are exemplary.

BRIEF DESCRIPTION OF THE FIGURES

The accompanying drawings, which are incorporated in and constitute a part of this specification, illustrate a number of non-limiting embodiments of the invention and together with the description, serve to explain the principles of the invention.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts. It is to be understood that both the foregoing general description and the following detailed description are exemplary and explanatory only and are not restrictive of the invention, as claimed.

Figure 1:
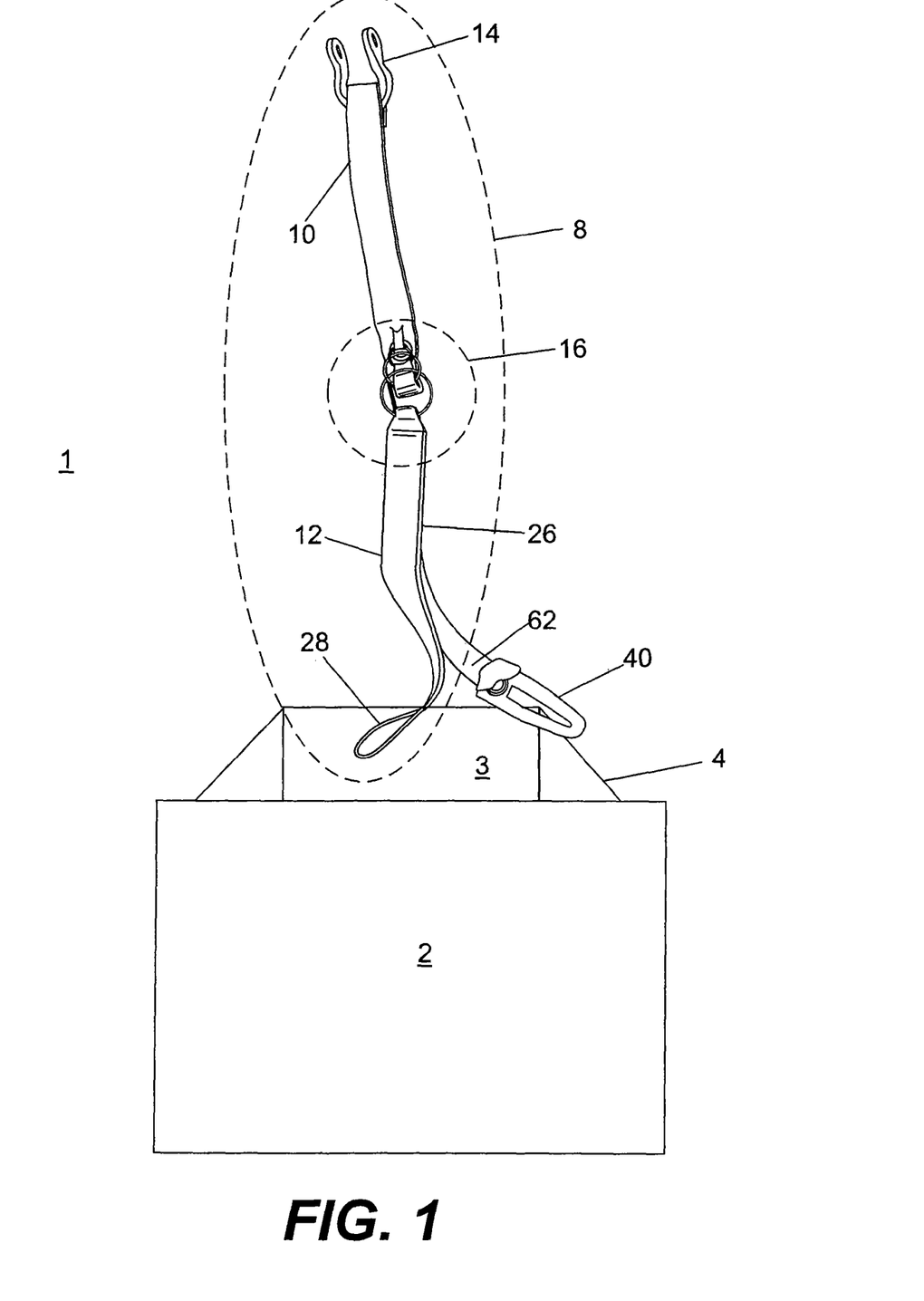
FIG. 1 is an illustration of exemplary parachute and cargo systems, including an exemplary parachute deployment line.

FIG. 1 is an illustration of an exemplary parachute and cargo system 1, including an exemplary parachute deployment line 8 and restraint release device 40. Parachute and cargo systems may be utilized for delivering cargo from an aircraft to a ground location while slowing descent, among other things. Such systems may include static deployment lines, thereby enabling deployment of a parachute upon the system's exit from an aircraft (i.e., minimizing manual intervention). Cargo 2 may be associated with a parachute container 3 containing a parachute (not shown). Parachute container 3 may be secured to cargo 2 via restraints 4 to substantially maintain contact between parachute container 3 and cargo 2 until exit from an aircraft. Parachute deployment line 8 may then provide an operable connection between an aircraft (not shown), parachute container 3, parachute (not shown), and restraint release device 40, among other things.

Figure 2:
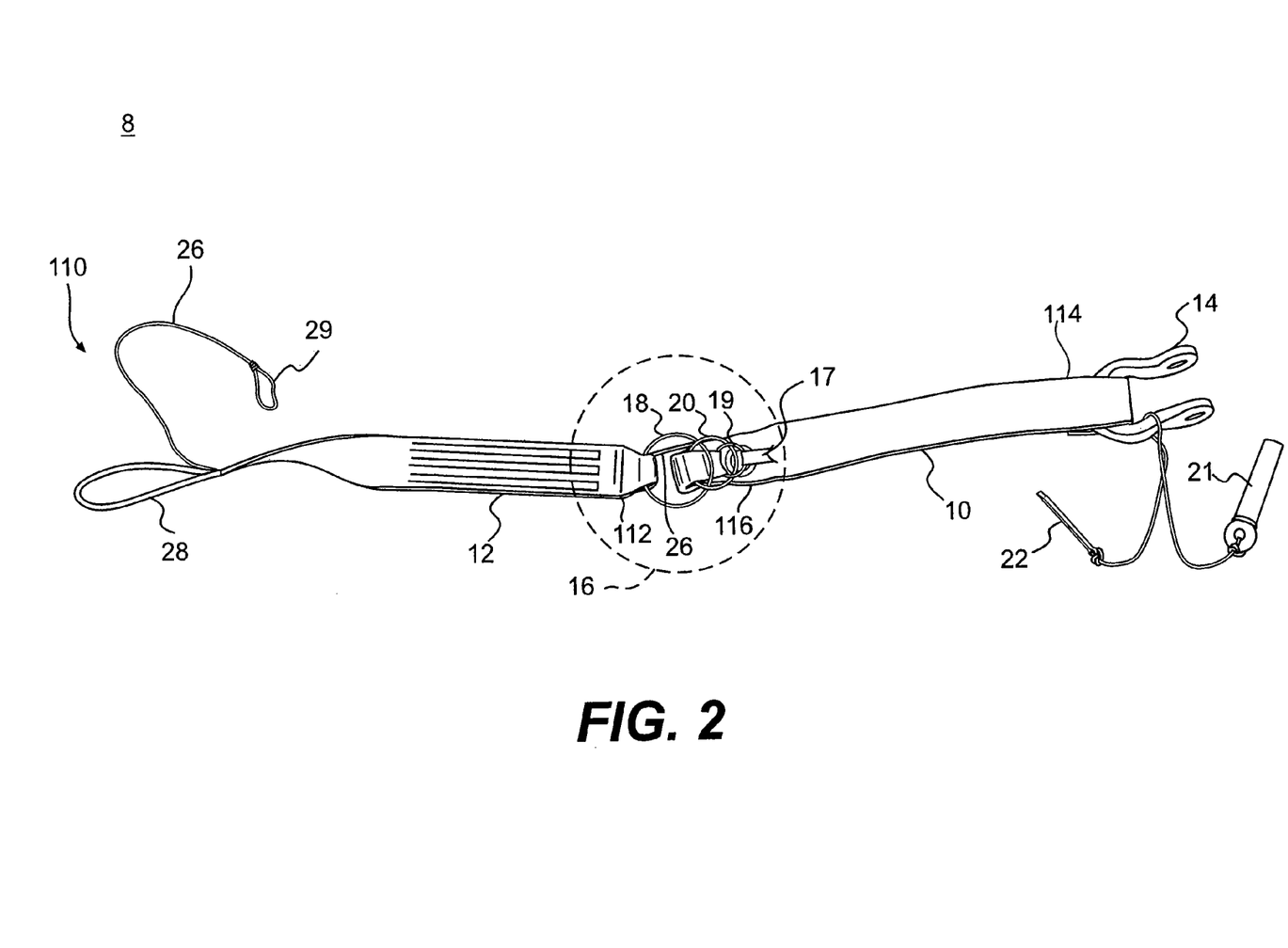
FIG. 2 is an illustration of a front section of an exemplary breakaway parachute deployment line associated with the parachute and cargo systems.

FIG. 2 is an illustration of a front section of an exemplary parachute deployment line 8 configured to breakaway upon deployment of the parachute. Parachute deployment line 8 may include a first segment of material 10, a second segment of material 12, a third segment of material 26, and a multi-ring release system 16.

First segment of material 10 may be configured to participate in static line deployment of a parachute associated with parachute and cargo system 1. First segment of material 10 may include an operable connection between an aircraft and multi-ring release system 16, and ultimately an operable connection to the parachute via second segment of material 12. First segment of material 10 may be comprised of a material with a desired strength for tolerating loads and stresses related to the deployment of parachute and cargo system 1. Such materials may include, for example, braided nylon, nylon webbing, polyester webbing, cotton webbing, and any other suitable material. The materials used may be sewn or otherwise fabricated into a design or shape such that a desired shape and strength may be obtained.

First segment of material 10 further may include an aircraft end 114 configured to be operably connected to an aircraft, and a release end 116 configured to be operably connected to a first section of a multi-ring release system 16. Aircraft end 114 may include a connecting device 14 configured to be operably affixed to an anchor (e.g., an anchor cable, hook, or other suitable device) associated with an aircraft. For example, connecting device 14 may include a clevis 14, pin 21, and cotter 22 configuration. In such a configuration, an anchor associated with an aircraft may be placed in the opening of clevis 14 and pin 21 inserted through clevis 14 to secure clevis 14 to the anchor. Cotter 22 may then be used to secure pin 21 within clevis 14. Alternatively, other configurations may be used for connecting device 14, such as, for example, a carabineer type connector, or any other suitable configuration allowing connection and disconnection of aircraft end 114 of first segment of material 10, to/from an anchor associated with an aircraft.

Release end 116 of first segment of material 10 may include an operable connection to a first section of multi-ring release system 16. Multi-ring release system 16 may be configured to allow first segment of material 10 to breakaway from second segment of material 12 following deployment of a parachute. A first section of multi-ring release system 16 may include a first ring 19, a second ring 20, and possibly also as many additional rings as desired. Although multi-ring release system 16 will be described in the context of a three-ring system in this description, more or fewer rings may be used as desired. For example, a multi-ring release system may include three, four, five, six, or more rings, depending on numerous factors such as potential load and length of parachute deployment line 8, among other things. Further, any ordinal identifier (e.g., first, second, etc.) used throughout this specification to reference a ring associated with multi-ring release system 16 is intended to be exemplary only and not to denote absolute order of rings or number of rings present in multi-ring release system 16. As noted, more or fewer rings may be utilized and any suitable natural number may be used to reference a ring in multi-ring release system 16. Moreover, rings associated with multi-ring release system 16 may not be limited to an annular shape and may be of any size and shape as desired.

First ring 19, second ring 20, as well as any additional rings, may be operably connected to first segment of material 10 using, for example, looped fabric, fasteners, eyelets, or other suitable fastening mechanisms. In one example, webbed nylon loops may be affixed (e.g., sewn, riveted, etc.) to first segment of material 10 with first ring 19 and second ring 20 passing through the openings created by the loops, as shown. This may allow at least some force exerted on each of first ring 19 and second ring 20—and any additional rings affixed to first segment of material 10 in a similar manner—to be transferred to first segment of material 10, and ultimately to an anchor device within an aircraft.

Load ring 18 may be operably connected to a ring end 112 of second segment of material 12. Both second segment of material 12 and load ring 18 may be configured to support a load associated with cargo 2 or any other item attached to a deployment end 110 of parachute deployment line 8 (e.g., a skydiver). Such a connection may be achieved using one or more types of connector structures such as, for example, fabric loops, grommets and fasteners, or any other suitable method. Load ring 18 may be of any desired diameter, and in one example, may be sized based on the load to be attached. Further, load ring 18 may include any material suitable for supporting an associated load.

Based on such a configuration, second ring 20 may be passed through load ring 18, and first ring 19 passed through second ring 20, with each ring pivoting to restrain the ring before it. First ring 19 may be restrained, as shown, by a cord section 17 configured to pass over first ring 19 and through first segment of material 10 (e.g., through a grommet). Cord section 17 may include a loop through which a retaining pin (shown in FIG. 3) may be passed, thereby substantially preventing cord section 17 from releasing first ring 19 until retaining pin 24 is slidably removed.

Figure 3:
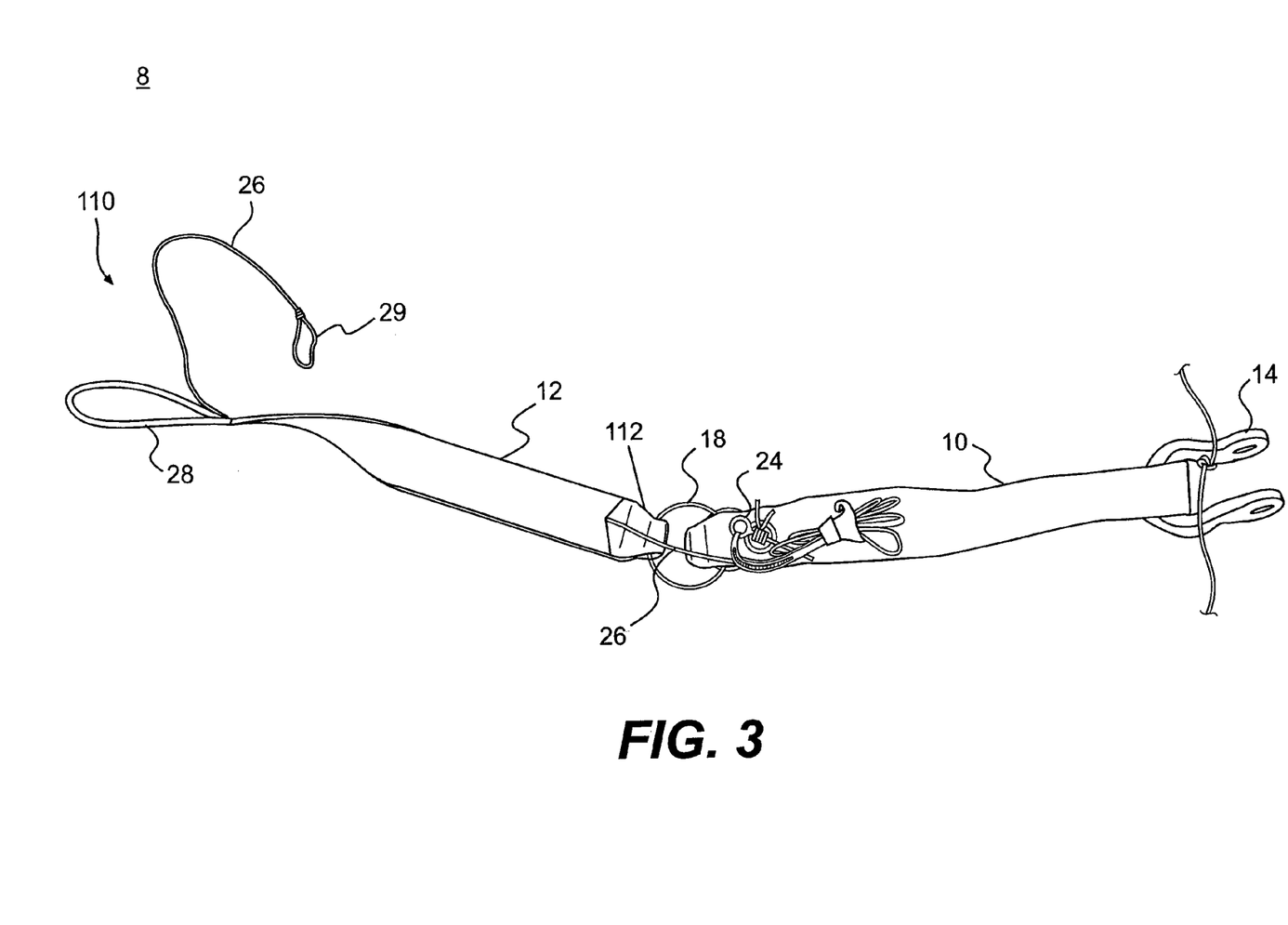
FIG. 3 is an illustration of a rear section of the exemplary breakaway parachute deployment line shown in FIG. 2.

FIG. 3 is an illustration of a rear section of an exemplary breakaway parachute deployment line 8 highlighting a method for restraining first ring 19, and upon assembly of multi-ring release system 16, all rings of multi-ring release system 16. Retaining pin 24 may include a cotter or other similar pin with a length greater than the width of the opening in first segment of material 10 through which cord section 17 is configured to pass. Retaining pin 24 may further include safety devices (e.g., safety ties) to minimize the likelihood of removal prior to a desired removal time.

Retaining pin 24 may be operably connected to a pin end of third segment of material 26 such that, upon a force being exerted on third segment of material 26, retaining pin 24 may be slidably extracted from cord section 17, thereby allowing first ring 19 to move freely about its connection to first segment of material 10. This may, in turn, allow each ring of multi-ring release system 16 to cascade free from its restraining ring, resulting in separation of load ring 18 from multi-ring release system 16 and disconnection of first segment of material 10 from second segment of material 12.

Second segment of material 12 may include an operable connection between multi-ring release system 16, a parachute container 3, and ultimately an aircraft via first segment of material 10. Second segment of material 12 may include a ring end 112, configured to be operably connected to load ring 18 and subsequently to multi-ring release system 16 (e.g., load ring 18), and a deployment end 110. Second segment of material 12 may be comprised of a material with a desired strength for tolerating loads and stresses related to the deployment of a parachute system and associated cargo. Such materials may include, for example, braided nylon, nylon webbing, cotton webbing, and any other suitable material. The materials used may be sewn or otherwise fabricated into a design or shape such that a desired shape and strength may be obtained.

Deployment end 110 may be configured to provide an operable connection between an aircraft and parachute container 3. Deployment end 110 may include a device enabling operation of an opening mechanism associated with parachute container 3. For example, deployment end 110 may include a length of material associated with second segment of material 12 looped back and affixed onto another area of second segment of material 12. This may result in formation of a container loop 28, as shown in FIG. 3, associated with deployment end 110. In such a configuration, container loop 28 may be operably connected to an opening mechanism associated with parachute container 3 such that, upon a force being applied to second segment of material 12 (e.g., upon deployment of parachute system from an aircraft), container loop 28 may cause actuation of the opening mechanism associated with parachute container 3 and subsequent deployment of the parachute (not shown).

As described above, ring end 112 of second segment of material 12 may include an operable connection to load ring 18 associated with multi-ring release system 16. Load ring 18 may be operably connected to ring end 112 in any suitable manner. For example, material associated with ring end 112 may be looped back upon itself resulting in formation of a fabric loop. Load ring 18 may then be inserted inside the formed loop and the loop secured to second segment of material 12. One of ordinary skill in the art will recognize that numerous methods exist for securing load ring 18 to ring end 112. Any such method is intended to fall within the scope of the present disclosure.

Third segment of material 26 may be configured to provide an operable connection between a parachute (not shown) and retaining pin 24, among other things. Third segment of material 26 may be comprised of materials such as, for example, a cord or strap, having suitable strength for bearing loads associated with third segment of material 26. In one example, third segment of material 26 may include a nylon or polyester cord of a desired length, enabling a connection between parachute (not shown) and retaining pin 24. Further, third segment of material 26 may be configured to pass slidably through a sleeve or pocket associated with second segment of material 12 to substantially prevent third segment of material from becoming tangled or otherwise encumbered.

To facilitate an operable connection between parachute (not shown) and retaining pin 24, third segment of material 26 may include a canopy loop 29 or other suitable connector associated with a parachute end and be configured to be operably connected to a parachute (not shown). Such a canopy loop 29 (or other device) may be connected to the parachute (not shown) prior to the parachute being packed into parachute container 3, or alternatively, the parachute may be connected to canopy loop 29 after being packed into parachute container 3 (e.g., an extension line outside of parachute container 3 may be used for the connection).

As noted above, a pin end associated with third segment of material 26 may be operably connected to retaining pin 24. For example, retaining pin 24 may include a connection point (e.g., a hole or loop) such that the pin end may be tied, clipped, or otherwise affixed to retaining pin 24. When a pulling force is applied to third segment of material 26 at parachute end, a force may be transferred to retaining pin 24, thereby causing retaining pin 24 to be slidably removed from cord section 17. For example, because third segment of material 26 may be of a finite length, during descent of parachute system 1, parachute may eventually exert a pulling force on third segment of material 26. This force may be sufficient to slidably extract retaining pin 24 from cord section 17 such that multi-ring release system 16 is released and second segment of material 12 is allowed to breakaway from first segment of material 10.

Figure 4:
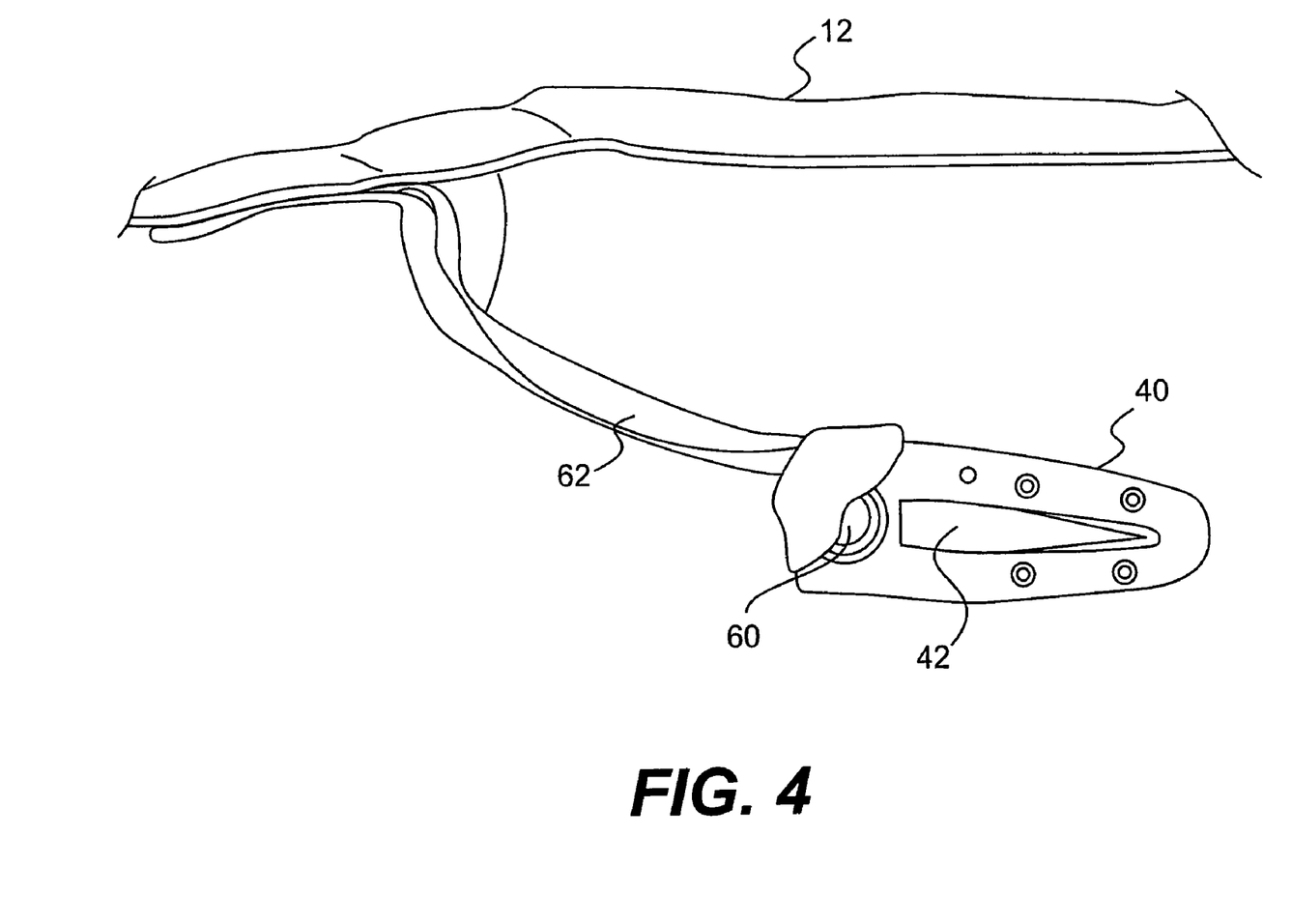
FIG. 4 is an illustration of a second segment of material associated with the exemplary parachute deployment line shown in FIG. 2, and an exemplary restraint release device.

FIG. 4 is a sectional illustration of a length of second segment of material 12 associated with an exemplary parachute deployment line 8 and an exemplary restraint release device 40. Restraint release device 40 may be configured to cause a release (e.g., cutting) of parachute restraints 4 upon deployment of parachute system 1 from an aircraft such that parachute container 3 may be removed from direct contact with cargo 2. Cargo 2 may then subsequently remain connected to parachute container 3—and parachute (not shown)—via straps, risers, or other suitable connecting devices while descending.

Restraint release device 40 may be operably connected to parachute deployment line 8 via a length of material 62 and release connector 60 such that, upon deployment, forces exerted on parachute deployment line 8 may be transferred to restraint release 40 via length of material 62. Length of material 62 may be comprised of any suitable material configured to substantially withstand such forces and may be affixed at any desired location on parachute deployment line 8 (e.g., second segment of material 12).

Figure 5A:
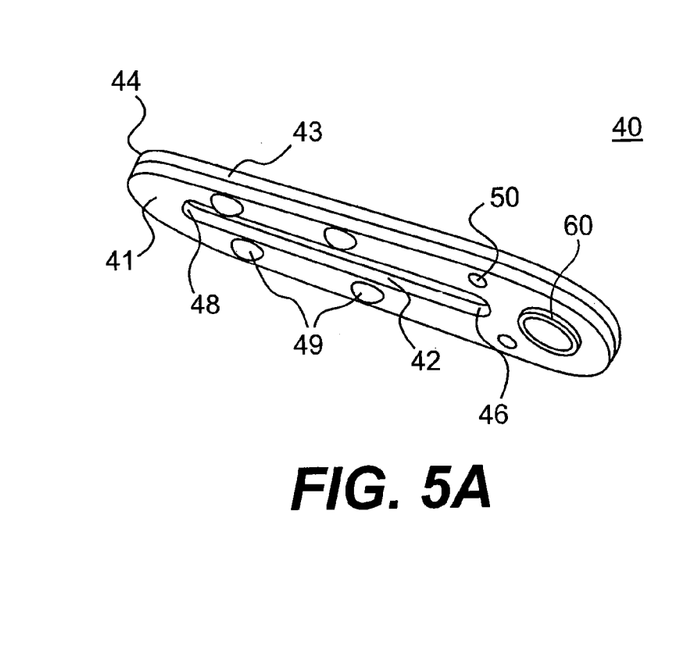
FIG. 5A is a detailed illustration of the exemplary restraint release device of FIG. 3.
Figure 5B:
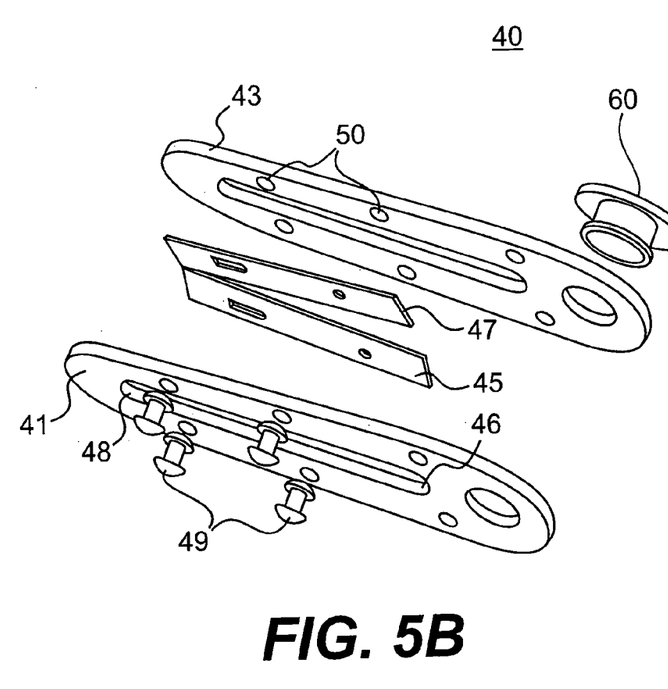
FIG. 5B is an exploded detailed illustration of the exemplary restraint release device of FIG. 5A.

FIG. 5A is a detailed illustration of an exemplary assembled restraint release device 40, and FIG. 5B shows an exemplary restraint release device 40 in an exploded view. Restraint release device 40 may include a frame 44 having a first end 46 and a blade end 48, and two or more blades 45 and 47. Frame 44 may be configured to provide support to blades 45 and 47. Frame 44 may include a first support member 41 and a second support member 43 configured to be operably connected, which may result in formation of a substantially single entity associated with frame 44. First support member 41 and second support member 43 may be of substantially the same size and shape and, in one example, each of first support member 41 and second support member 43 may be of a substantially oval or oblong shape and may taper from a first end 46 to a blade end 48. Further, first support member 41 and second support member 43 may include one or more fastening points 50 configured to receive fasteners 49 for purposes of operably connecting together first support member 41 and second support member 43, among other things. Fastening points 50 associated with first support member 41 may be substantially aligned with fastening points 50 associated with second support member 43, thus enabling fastening by fasteners 49. One of ordinary skill in the art will recognize that first support member 41 and second support member 43 may be of any suitable size and shape (e.g., a trapezoid) without departing from the scope of the present disclosure.

Each of first support member 41 and second support member 43 may be fabricated or otherwise manufactured from materials including, for example, aluminum, steel, and/or any other suitable material. In one example, first support member 41 and second support member 43 may include a military-grade aluminum material.

In addition to fastening points 50, each of first support member 41 and second support member 43 may also include an aperture 42 configured to receive at least one object (e.g., restraints 4). Each aperture 42 associated with first support member 41 and second support member 43 may be configured to be substantially aligned upon assembly of first support member 41 and second support member 43, such that a substantially singular aperture may result. Therefore, each aperture 42 associated with first and second support members 41 and 43 may be of substantially the same size, shape, and location within first support member 41 and second support member 43. Further, each aperture 42 may be defined by one or more edges extending substantially parallel to the perimeter of its associated support member (e.g., first support member 41 or second support member 43). In one example, each aperture 42 may be of an oval or oblong shape and may taper from a first end 46 to a blade end 48 of frame 44. One of skill in the art will recognize that aperture 42 may be of any desired size and shape and the examples described herein are not intended to be limiting.

Figure 6:
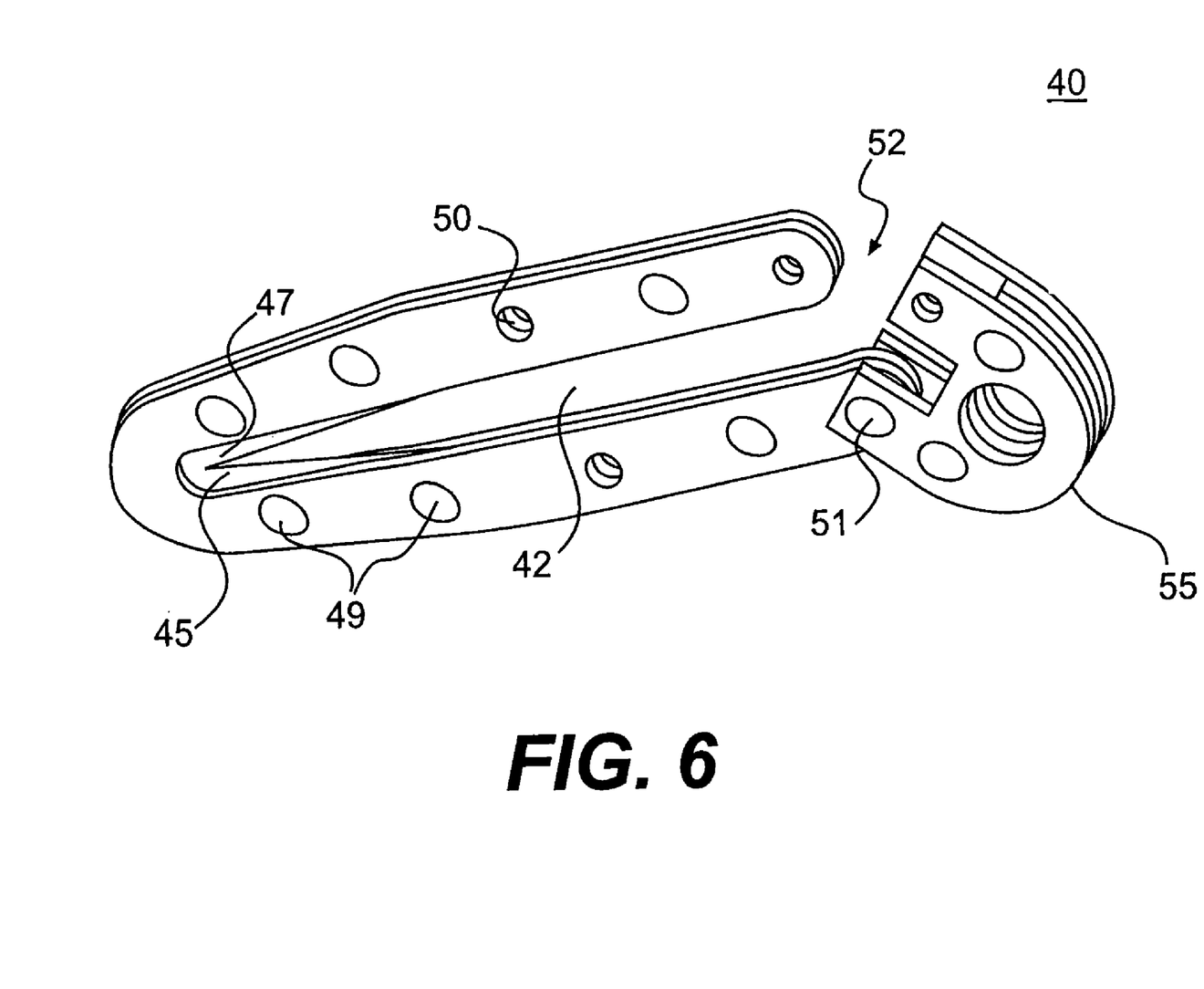
FIG. 6 is an illustration of yet another exemplary restraint release device including a hinged opening.

Each aperture 42 may be configured to receive at least one object (e.g., one or more restraints 4) within aperture 42. For example, free ends associated with restraints 4 may be passed through aperture 42 and the free end subsequently secured (e.g., to cargo 2). Because aperture 42 may be fully enclosed, it may be desirable to maintain a free end of an object such that the free end may be passed through aperture 42 and secured. Alternatively, as shown in FIG. 6, another exemplary restraint release device 40 may include a hinged opening 52 allowing access to aperture 42. In such an exemplary restraint release device 40, first support member 41 and second support member 43 may include a hinged fastening point 51 at first end 46 associated with frame 44. In addition to hinged fastening point 51, first support member 41 and second support member 43 may further include a hinged section 55 configured to pivot about hinged fastening point 51 to allow creation of opening, 52, and thus positioning of an object lacking a free end within aperture 42. Following positioning of an object within aperture 42, hinged section 55 may be pivoted about hinged fastening point 51 and subsequently secured (e.g., with fasteners 49 and/or any other suitable connector) thereby closing opening 52 to aperture 42.

Returning to FIGS. 5A and 5B, blades 45 and 47 may be configured to cause a cutting of an object (e.g., release of restraints 4). Blades 45 and 47 may include a material conducive to creating a cutting surface (e.g., a sharp edge), including for example, steel or stainless steel that has been sharpened or otherwise treated to provide a sharp edge. For example, blades 45 and 47 may be manufactured from a steel material, hardened, and honed using conventional methods for creating a single bladed cutting surface. While blades 45 and 47 are described herein as two separate pieces of material, it may be possible to combine blades 45 and 47 such that a single piece of material comprises the cutting surfaces associated with blades 45 and 47.

Blades 45 and 47 may be opposably mounted at blade end 46 associated with frame 44 such that at least one cutting surface may be exposed within aperture 42. Exposure of at least one cutting surface may create an area conducive to cutting an object within aperture 42 when a force is applied to frame 44. In one example, blades 45 and 47 may be mounted at an angle approximating a taper associated with aperture 42 such that an acute angle (e.g., approximately 10 to 20 degrees) is formed between the cutting surface of each of blades 45 and 47. One of ordinary skill in the art will recognize that other suitable acute angles and configurations associated with blades 45 and 47 may be utilized without departing from the scope of the present disclosure.

Blades 45 and 47 may further include one or more fastening points that may be substantially aligned with fastening points 50 associated with first support member 41 and second support member 43. Such a configuration may allow for a removable connection of blades 45 and 47 to frame 44, and may, therefore, allow for interchanging (e.g., replacement) of blades at desired intervals. In addition, one or more fastening points associated with blades 45 and 47 may include elongated holes to allow for location adjustment of blades 45 and 47 in relation to fastening points 50 within aperture 42. Such a configuration may be desirable to generate a desired cutting force on objects within aperture 42, among other things.

INDUSTRIAL APPLICABILITY

The disclosed devices may be applicable to any parachute system. The disclosed devices may particularly applicable to cargo delivered via airdrop from an aircraft to remote locations using a static parachute deployment line. Because the disclosed devices may assist in reducing stresses associated with static line deployment of a parachute associated with cargo, damage, particularly to the parachute canopy, may be reduced. Further, wear associated with a restraint release may also be reduced, while allowing for replacement of worn items associated with the restraint release. Operation of the disclosed embodiments of the devices will now be explained.

The following discussion presumes that a parachute suitable for delivering cargo 2 from an altitude associated with an aircraft has been packed into parachute container 3, and that parachute container 3 has been, or will be, affixed substantially in contact with cargo 2 using restraints 4 prior to deployment from an aircraft. It is also presumed that cargo straps/risers or other suitable device (not shown) may be used to suspend cargo 2 from parachute (not shown) following deployment, as is known in the art.

Figure 7:
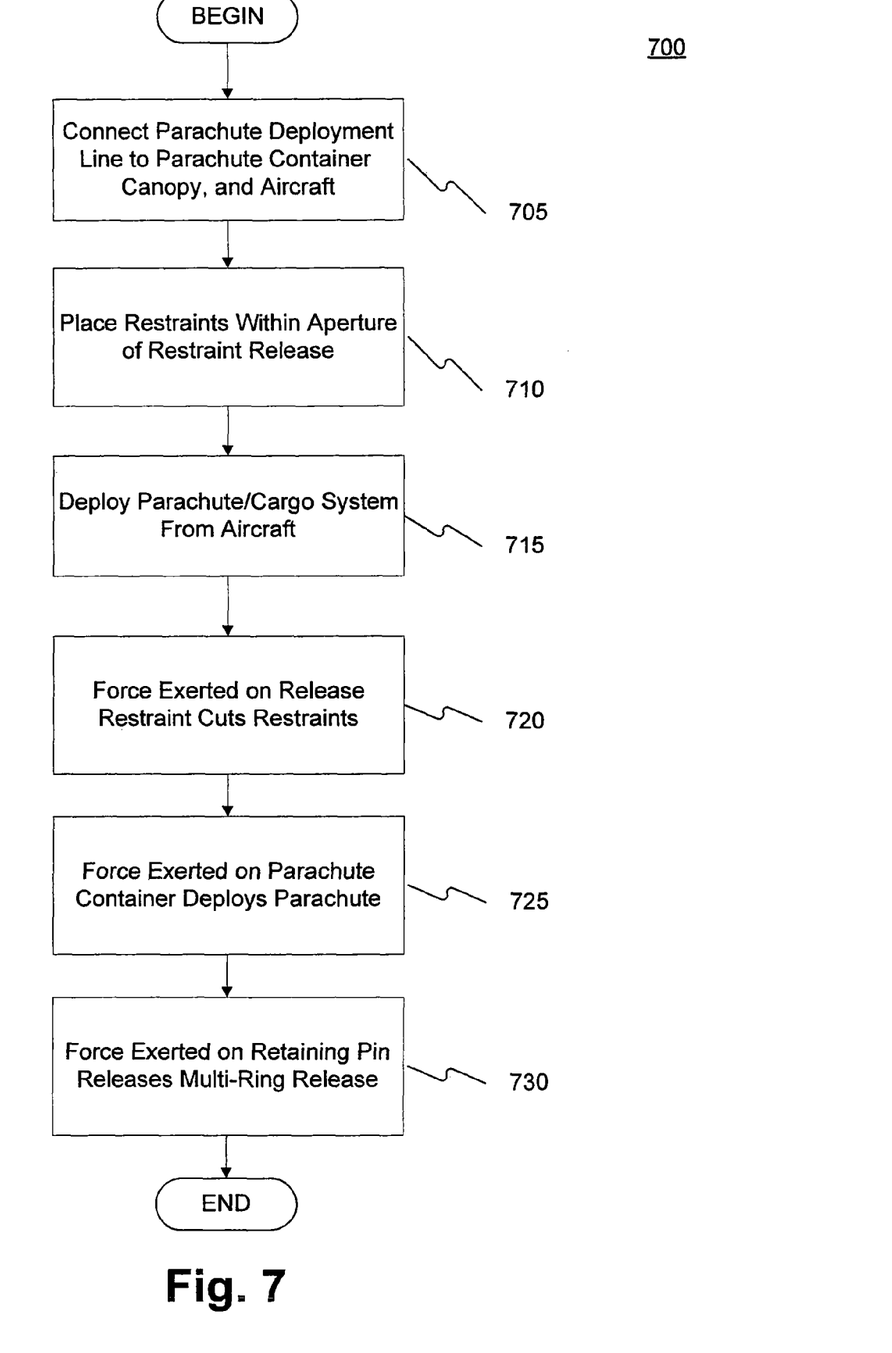
FIG. 7 is an exemplary flowchart illustrating a method for deployment of an exemplary parachute and cargo system.

FIG. 7 is an exemplary flowchart 700 illustrating a method for deployment of an exemplary parachute and cargo system 1. Elements associated with parachute deployment line 8 may be operably connected to an aircraft at aircraft end 114 (e.g., via connector 14), parachute container 3 at container loop 28, and parachute canopy (not shown) at canopy loop 29 (step 705). Further, multi-ring release system 16 may be assembled and retaining pin 24 inserted through cord section 17, such that first ring 19 is retained, thereby retaining subsequent rings (e.g., second ring 20 and load ring 18).

Restraints 4 may then be placed within aperture 42 of restraint release device 40 (step 710). A free end associated with restraints 4 may be placed through aperture 42 and secured such that parachute container 3 is substantially in contact with cargo 2 prior to exiting the aircraft. Alternatively, if restraints 4 have already been tied off or otherwise secured to cargo 2, a hinged release device 40 (e.g., similar to that shown in FIG. 6) may be used such that hinge section 55 may be opened, restraints 4 placed within aperture 42, and hinge section 55 closed to retain restraints 4.

Upon reaching a delivery location associated with cargo 2, parachute and cargo system 1 may be deployed from the aircraft (step 715). For example, parachute and cargo system 1 may be pushed or otherwise forced to leave the inside of the aircraft.

Because segments of material associated with parachute deployment line 8 may be of fixed length, as parachute and cargo system 1 descends away from the aircraft, and because aircraft end 114 of parachute deployment line 8 may be operably connected to the aircraft, pulling forces may be exerted on various components of parachute deployment line 8. Restraint release device 40 may receive a pulling force causing restraints 4 to be drawn into the acute angle formed between blades 45 and 47, thereby resulting in contact with cutting surfaces. Such contact may then result in a cutting (i.e., release) of restraints 4 (step 720). Subsequently, a force exerted through parachute deployment line 8 to container loop 28 may cause an opening of parachute container 3 and deployment of parachute canopy (not shown) (step 725).

As parachute and cargo system 1 continue to descend away from the aircraft, the connection between canopy loop 29 and retaining pin 24 via third length of material 26 may undergo a pulling force, which may result in the removal of retaining pin 24 from cord section 17 (step 730). As described above, upon removal of retaining pin 24 from cord section 17, each ring associated with multi-ring release section 16 may cascade loose, thereby releasing load ring 18 from multi-ring release system 16. Such a release may then result in separation of first segment of material 10 from second segment of material 12 and, therefore, breakaway of parachute release line 8.

Utilizing devices and methods of the present disclosure may result in reductions in force used for releasing restraints 4 and breaking away parachute deployment line 8. For example, utilizing some exemplary devices and methods of the present disclosure may result in a maximum breakaway force of approximately 52 to 75 pounds. Further, some exemplary devices and methods of the present disclosure may result in a maximum restraint release force of approximately 28 to 32 pounds, while minimizing damage to restraint release device 40.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A restraint release device for a parachute system, comprising:

a frame comprising a first support member and a second support member, each of the first member and the second member further comprising an aperture configured to receive at least one object; and two or more blades each comprising a cutting surface, wherein the two or more blades are opposably mounted at a blade end associated with the frame, wherein the cutting surface of each of the two or more blades is exposed within the aperture such that an acute angle between the cutting surface of each of the two or more blades is formed within the aperture at the blade end, wherein the restraint release device is operably connected to a deployment line associated with the parachute system.

2. The restraint release device of claim 1, further comprising a hinged section associated with the frame, wherein the hinged section is configured to open, to allow the at least one object to be positioned within the aperture.

3. The restraint release device of claim 1, wherein each of the first support member and the second support member further comprises one or more fastening points.

4. The restraint release device of claim 3, wherein the two or more blades are removably mounted between the first support member and the second support member and fastened at the one or more fastening points.

5. The restraint release device of claim 1, wherein the at least one object includes one or more restraining lines configured to secure the parachute system to a cargo.

6. The restraint release device of claim 1, wherein the aperture is of an oval shape.

7. The restraint release device of claim 6, wherein the aperture is tapered at the blade end of the first support member and second support member, such that a substantially V-shaped area exists at the blade end.

8. The restraint release device of claim 1, further comprising a segment of material configured to operably connect the frame to the deployment line associated with the parachute system.

9. The restraint release device of claim 1, wherein the two or more blades are configured to create an opposable shearing force upon the one or more objects.

10. A parachute deployment system, comprising:

a first segment of material comprising an aircraft end configured to be operably connected to an aircraft, and a release end configured to be operably connected to a first section of a multi-ring release system;

a second segment of material comprising a container end configured to be operably connected to a parachute container, and a ring end configured to be operably connected to a second section of the multi-ring release system; and a third segment of material comprising a parachute end configured to be operably connected to a parachute within the parachute container, and a pin end configured to be operably connected to a retaining pin associated with the first section of the multi-ring release system, wherein the retaining pin is configured to be slidably positioned within a retaining loop associated with the multi-ring release system;

a restraint release device, comprising a frame comprising a first support member and a second support member, each of the first member and the second member further comprising an aperture configured to receive at least one object; and two or more blades each comprising a cutting surface, wherein the two or more blades are opposably mounted at a blade end associated with the frame, wherein the cutting surface of each of the two or more blades is exposed within the aperture such that an angle between the cutting surface of each of the two or more blades is formed within the aperture at the blade end, wherein the restraint release device is operably connected to a deployment line associated with the parachute system.

11. A system, comprising:

a cargo;

a parachute operably connected to the cargo;

a releasable deployment line operably connected to the parachute, comprising, a first segment of material comprising an aircraft end configured to be operably connected to an aircraft, and a release end configured to be operably connected to a first section of a multi-ring release system;

a second segment of material comprising a container end configured to be operably connected to a parachute container, and a ring end configured to be operably connected to a second section of the multi-ring release system; and a third segment of material comprising a parachute end configured to be operably connected to a parachute within the parachute container, and a pin end configured to be operably connected to a retaining pin associated with the first section of the multi-ring release system, wherein the retaining pin is configured to be slidably positioned within a retaining loop associated with the multi-ring release system; and a restraint release device operably connected to the releasable deployment line, comprising a frame comprising a first support member and a second support member, each of the first member and the second member further comprising an aperture configured to receive at least one object; and two or more blades each comprising a cutting surface, wherein the two or more blades are opposably mounted at a blade end associated with the frame, wherein the cutting surface of each of the two or more blades is exposed within the aperture such that an acute angle between the cutting surface of each of the two or more blades is formed within the aperture at the blade end.

* * * * *